(12) United States Patent
Soares et al.

(10) Patent No.: US 12,561,883 B1
(45) Date of Patent: Feb. 24, 2026

(54) HYBRID APPROACH TO ACCURATE USER REPRESENTATION

(71) Applicant: Apple Inc., Cupertino, CA (US)

(72) Inventors: Olivier Soares, Oakland, CA (US); Yang Song, San Jose, CA (US); Graham L. Fyffe, Playa Vista, CA (US); Gilles M. Cadet, Agoura Hills, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 18/174,477

(22) Filed: Feb. 24, 2023

Related U.S. Application Data

(60) Provisional application No. 63/268,455, filed on Feb. 24, 2022.

(51) Int. Cl.
| | |
|---|---|
| *G06T 15/04* | (2011.01) |
| *G06T 7/40* | (2017.01) |
| *G06T 17/20* | (2006.01) |
| *G06T 19/20* | (2011.01) |

(52) U.S. Cl.
CPC .............. *G06T 15/04* (2013.01); *G06T 7/40* (2013.01); *G06T 17/20* (2013.01); *G06T 19/20* (2013.01); *G06T 2207/20081* (2013.01); *G06T 2207/20084* (2013.01); *G06T 2207/30201* (2013.01); *G06T 2219/024* (2013.01); *G06T 2219/2012* (2013.01); *G06T 2219/2021* (2013.01)

(58) Field of Classification Search
CPC G06T 15/04; G06T 7/40; G06T 17/20; G06T 19/20; G06T 2207/20081; G06T 2207/20084; G06T 2207/30201; G06T 2219/024; G06T 2219/2012; G06T 2219/2021
See application file for complete search history.

(56) References Cited

U.S. PATENT DOCUMENTS

| | | | | |
|---|---|---|---|---|
| 11,222,466 | B1* | 1/2022 | Naruniec | ............... G06N 3/088 |
| 2020/0402284 | A1* | 12/2020 | Saragih | ............... G06V 10/757 |
| 2023/0177755 | A1* | 6/2023 | Starke | ....................... G06N 3/08 |
| | | | | 345/473 |
| 2023/0252714 | A1* | 8/2023 | Bradley | ............... G06T 15/205 |
| | | | | 345/582 |

\* cited by examiner

*Primary Examiner* — Xin Sheng
(74) *Attorney, Agent, or Firm* — Blank Rome LLP

(57) ABSTRACT

Rendering an avatar for a user in a communication session includes obtaining enrollment data associated with the user. For each of one or more frames of the communication session, a set of expression latents is obtained for the user. A first texture for a first portion of the face of the user is generated based on the enrollment data and expression latents. A combined albedo map is generated based on one or more identity textures from the enrollment data and the first texture. A target texture is generated based on the one or more identity textures and the combined albedo map for a particular frame of the one or more frames.

20 Claims, 11 Drawing Sheets

CAPTURE EXPRESSION
IMAGES
205

CONVERT TO MESHES
215

TRAIN EXPRESSION AUTO-
ENCODER
225

TRAIN EXPRESSION
MODEL USING AUTO-
ENCODER LATENTS AND
CORRESPONDING MESHES
235

EXPRESSION MODEL
240

200

210

220

230

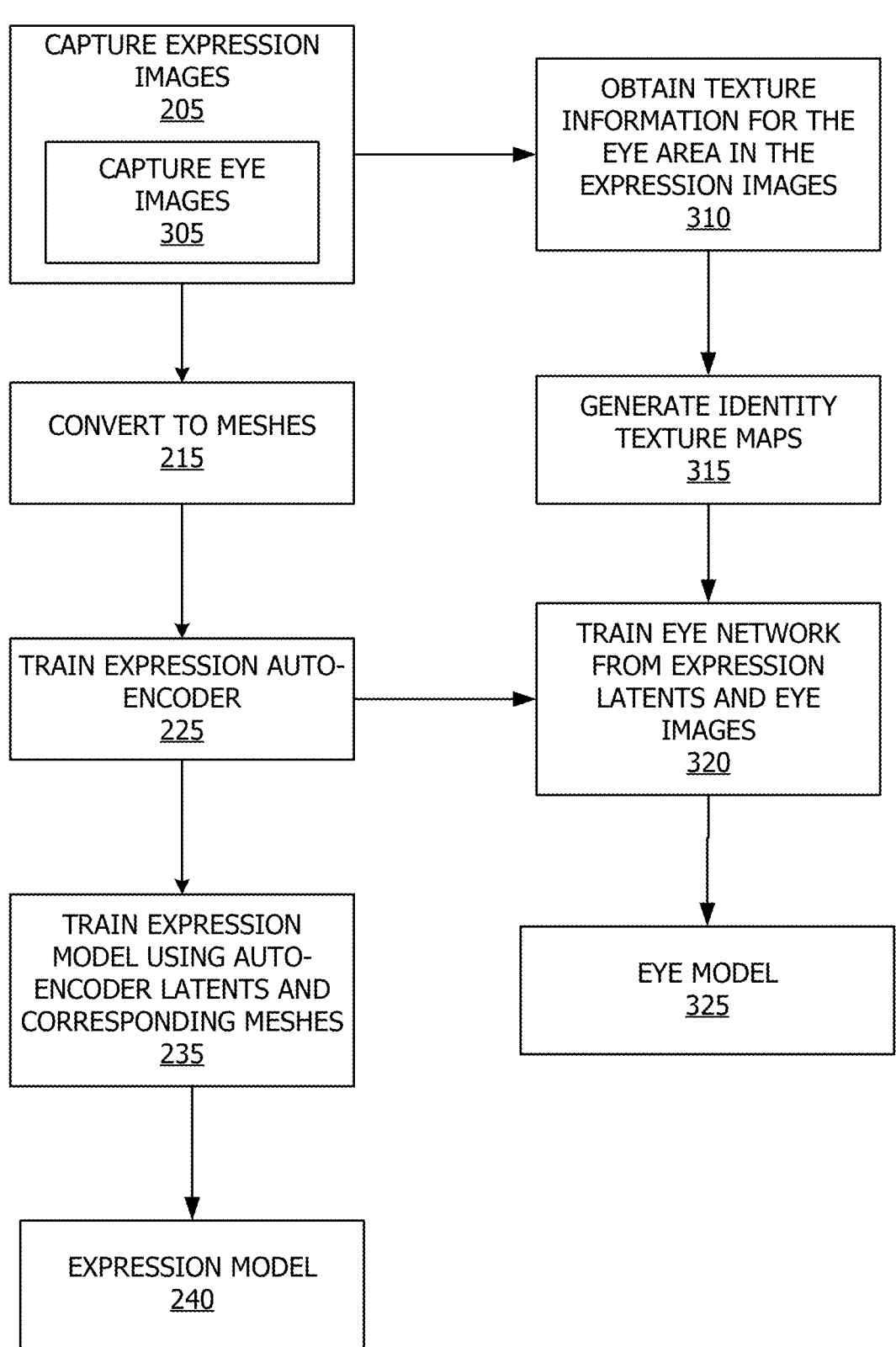

CAPTURE EXPRESSION IMAGES
205

CAPTURE EYE IMAGES
305

OBTAIN TEXTURE INFORMATION FOR THE EYE AREA IN THE EXPRESSION IMAGES
310

CONVERT TO MESHES
215

GENERATE IDENTITY TEXTURE MAPS
315

TRAIN EXPRESSION AUTO-ENCODER
225

TRAIN EYE NETWORK FROM EXPRESSION LATENTS AND EYE IMAGES
320

TRAIN EXPRESSION MODEL USING AUTO-ENCODER LATENTS AND CORRESPONDING MESHES
235

EYE MODEL
325

EXPRESSION MODEL
240

*FIG. 3*

HYBRID APPROACH TO ACCURATE USER REPRESENTATION

BACKGROUND

Computerized characters that represent and are controlled by users are commonly referred to as avatars. Avatars may take a wide variety of forms, including virtual humans, animals, and plant life. Some computer products include avatars with facial expressions that are driven by a user's facial expressions. One use of facially-based avatars is in communication, where a camera and microphone in a first device, transmits audio and a real-time 2D or 3D avatar of a first user to one or more second users, such as other mobile devices, desktop computers, videoconferencing systems and the like. Known existing systems tend to be computationally intensive, requiring high-performance general and graphics processors, and generally do not work well on mobile devices such as smartphones or computing tablets. Further, existing avatar systems do not generally provide the ability to communicate nuanced facial representations or emotional states in realistic lighting.

BRIEF DESCRIPTION OF THE DRAWINGS

FIG. 3 shows, in flowchart form, a technique for generating an eye model, according to one or more embodiments.

DETAILED DESCRIPTION

Figure 1:
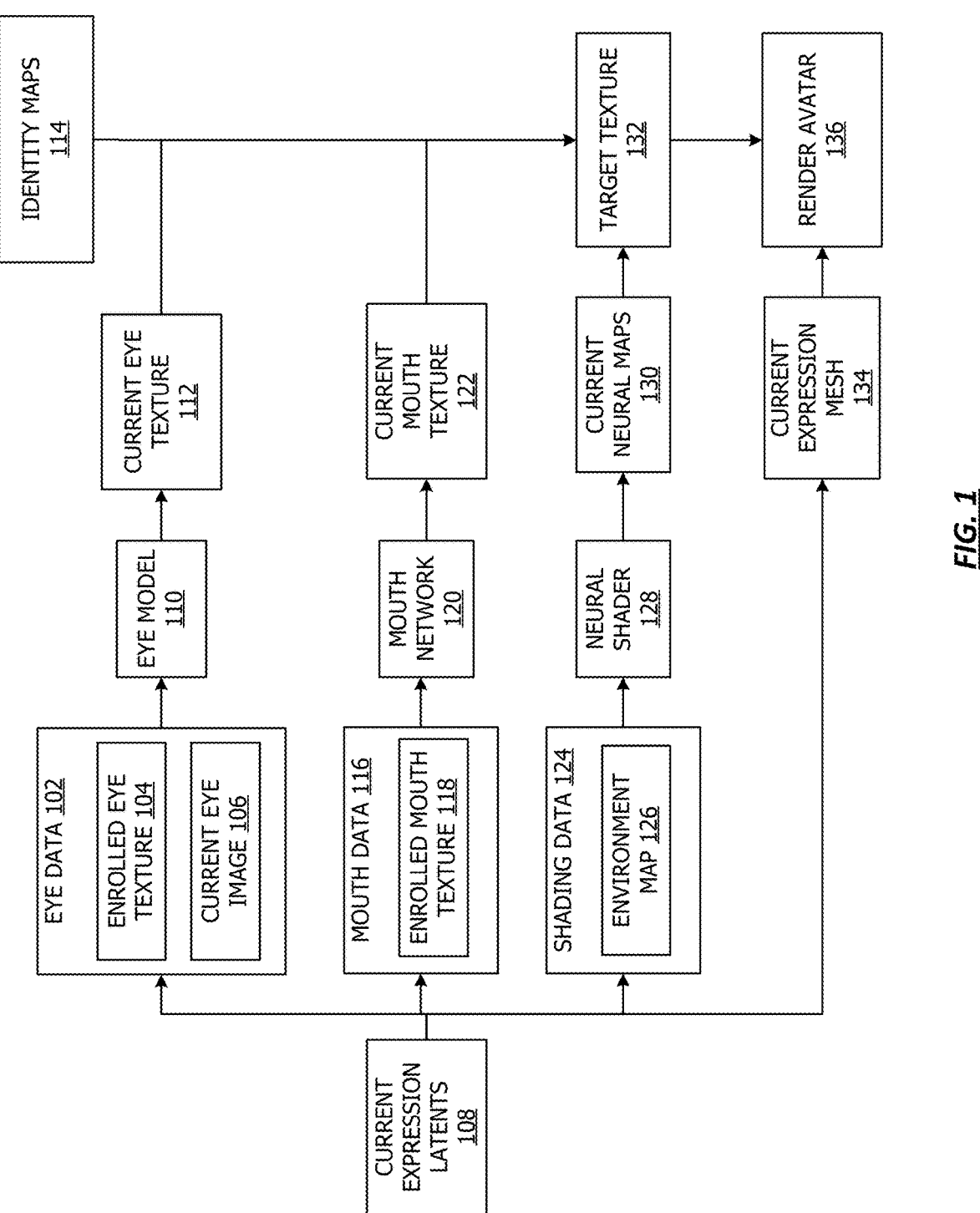
FIG. 1 shows a simplified flow diagram for generating a target texture and rendering an avatar, according to one or more embodiments.

This disclosure relates generally to image processing. More particularly, but not by way of limitation, this disclosure relates to techniques and systems for generating and utilizing machine learning for rendering an avatar.

This disclosure pertains to systems, methods, and computer-readable media to generating an avatar. Generally, a texture for an avatar may be generated in a hybrid manner, for example, using trained autoencoders, as well as camera feed data. In some embodiments, the process for generating the texture may be broken up into smaller, targeted algorithms for particular portions of the face, such as eyes and mouth. As such, compute resources for the smaller portions of the face can be reduce, as well as the overall face.

In one or more embodiments, an image-based communication session may be initiated between a first device and a second device, where the first device is associated with a user. Enrollment data for a user of the first may be obtained, which may include such information as texture information and geometric information. For example, a set of identity latents may be obtained for the remote user, from which a neutral geometric mesh can be generated that is specific to the face of the user. Regarding texture information, enrollment textures may include, for example, an albedo map, a normal map, and a specular map for the face.

During a call, the first device can run tracking algorithms, including, for example, face tracking and eye tracking. For example, for each frame, the first device may generate geometric information, such as expression latent values from which the geometry of the face can be generated, head pose, and/or eye information. In some embodiments, the eye information may include a predicted eye texture generated by a trained eye network. The eye network may be trained to predict a texture of an eye region on a face based on one or more current images of the eye region and enrollment data that includes an enrolled eye texture. For example, in some embodiments, the trained eye network may predict an eye image.

The first device can then transmit a set of reduced data indicative of the face of the user to the second device. This reduced data set may include, for example, geometric information, such as the expression latent values, as well as the eye network predicted texture, and/or head pose information for the user.

The second device can then receive the geometric information, eye network predicted texture, and/or head pose information. According to one or more embodiments, the second device can use the geometric information along with the enrollment information, such as one or more enrollment images of the face, to generate a mouth image. In particular, the second device may utilize a trained mouth network to predict a texture of a mouth based on the expression geometry (e.g., from the expression latent values) and the enrollment data. In addition, in some embodiments, the second device can generate one or more neural shading maps using the expression geometry, head pose, and lighting information for an environment in which the avatar of the user is to be presented. In some embodiments, a set of shading latents are obtained for each of a series of frames in the communication session, which represent the lighting of the image. The first device may utilize a shading encoder to obtain a set of shading latents. The first device may transmit the shading latents to a second device in the communication session. The second device may utilize a shading decoder to input the shading latents and obtain neural shading maps throughout the communication session.

According to some embodiments, the second device can use the eye network predicted texture, the mouth image, the neural shading maps, and the enrollment textures to calculate a final dynamic face texture. Optionally, a combined albedo texture may be generated from the albedo enrollment, along with the eye network predicted texture and the mouth texture, which may be lit according to the neural maps. In some embodiments, a GPU of the second device may calculate the final dynamic face texture. Because the second device has the geometric information in the form of expression latent values and/or identity latent values, the second device can calculate the final posed mesh. The final representation can be obtained at the second device by combining the posed mesh, the head pose, and the dynamic face texture.

For purposes of this disclosure, an autoencoder refers to a type of artificial neural network used to fit data in an unsupervised manner. The aim of an autoencoder is to learn a representation for a set of data in an optimized form. An autoencoder is designed to reproduce its input values as outputs, while passing through an information bottleneck that allows the dataset to be described by a set of latent variables. The set of latent variables are a condensed representation of the input content, from which the output content may be generated by the decoder. A trained autoencoder will have an encoder portion, a decoder portion, and the latent variables represent the optimized representation of the data.

For purposes of this disclosure, an "encoder" refers to a type of neural network which is configured to take in data and produce a set of data in an optimized form, for example as a set of latent variables. The encoder may or may not be part of an autoencoder, or trained as part of an autoencoder, according to various embodiments.

For purposes of this disclosure, a "decoder" refers to a type of neural network, which is configured to take in a compact representation of data, for example, in the form of latent variables, and produce content represented by the compact representation. The decoder may or may not be part of an autoencoder, or trained as part of an autoencoder, according to various embodiments.

For purposes of this disclosure, the term "avatar" refers to the virtual representation of a real-world subject, such as a person. The real-world subject may have a static shape or may have a shape that changes in response to movement or stimuli.

A physical environment refers to a physical world that people can sense and/or interact with without aid of electronic devices. The physical environment may include physical features such as a physical surface or a physical object. For example, the physical environment may correspond to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets).

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and these goals may vary from one implementation to another. It will also be appreciated that such development efforts might be complex and time-consuming but would nevertheless be a routine undertaking for those of ordinary skill in the design and implementation of graphics modeling systems, having the benefit of this disclosure.

Referring to FIG. 1, a flow diagram is presented in which a target texture is generated for rendering an avatar. While the various processes for generating a target texture and rendering an avatar may be described as being performed by particular devices, it should be understood that some or all of the process may be performed by alternate devices. As such, the process in FIG. 1 is described in a device-agnostic manner. However, it should be understood that in some embodiments, the actions may be distributed across two or more systems or devices.

Prior to the beginning of the flow diagram, enrollment data for a user may be obtained. The enrollment data may include, for example, an enrolled eye texture 104, an enrolled mouth texture 118, and/or identity texture maps 114. Additional enrollment data may include geometric enrollment data for the user, such as an enrollment mesh, latent variables corresponding to the mesh, and the like. In some embodiments, the latent variables may correspond to identity latent variables, as will be described below with respect to FIG. 2. According to one or more embodiments, the identity texture maps 114 may include, for example, a normal map comprising pseudo-normals indicative of a texture of the face, a diffuse albedo map indicative of the diffuse reflectance of the face, and a specular albedo map indicative of the specular reflectance of the face.

Beginning at 108, for each frame during the communication session, a set of current expression latents may be obtained. In some embodiments, the expression latents may describe, or may be used to predict, a current expressive geometry of the user for which an avatar is to be rendered. The expression latents may be obtained, for example, by translating one or more images of a face to a 3D mesh and applying the 3D mesh to a mesh decoder or other network configured to provide expression latent variables. The images of the face may be obtained, for example, from one or more cameras directed toward the face of the user. The determination of expression latents will be described in greater detail below with respect to FIG. 2.

The techniques described herein include combining texture data for various portions of the face and applying lighting to generate a texture for the avatar. In some embodiments, an eye texture 112 is obtained which includes a graphical image of a portion of the eyes of the user which can be overlaid over a mesh to generate an eye portion of the avatar. The eye texture 112 can be generated by an eye model 110, which is trained to predict the eye texture 112 based on eye data 102 which can include, for example, enrollment eye texture data 104, and a current eye image 106. In one or more embodiments, the enrollment eye texture may include an image patch of a region around one or both eyes of the user. The current eye image 106 may be image data captured during a communication session, such as a video feed or series of frames, and may include one or more images. The current eye image 106 may be obtained from one or more cameras facing the eye of the user. In some embodiments, the current eye image data 106 may be capture from a camera system dedicated to capturing images of one or both eyes. Further, the camera system may include one or more cameras capturing image data including each eye. According to one or more embodiments, the eye model 110 may be a trained network which is configured to predict a texture for the eye region based on current images of the eye and an enrolled eye texture. In some embodiments, the current eye image 106 may be pre-processed prior to providing the image data to the model. For example, a single image including a current view of both eyes may be captured or generated from the current eye image data 106 and provided to the eye model 110. The eye model 110 can then predict a current eye texture 112 based on the image data the enrollment data. The training and inference techniques for the eye model will be described in greater detail below with respect to FIGS. 3-4.

In some embodiments, a mouth texture 122 is obtained which includes a graphical image of a portion of the mouth of the user which can be overlaid over a mesh to generate a mouth portion of the avatar. The mouth texture 122 can be generated by a mouth network 120, which is trained to predict the mouth texture 122 based on mouth data 116 which can include, for example, enrollment mouth texture data 118, as well as the current expression latents 108 for the face. In one or more embodiments, the enrollment mouth texture may include an image patch of a region around the mouth of the user.

In some embodiments, the current eye image data 106 may be capture from a camera system dedicated to capturing images of one or both eyes. Further, the camera system may include one or more cameras capturing image data including each eye. According to one or more embodiments, the eye model 110 may be a trained network which is configured to predict a texture for the eye region based on current images of the eye and an enrolled eye texture. In some embodiments, the current eye image 106 may be pre-processed prior to providing the image data to the model. For example, a single image including a current view of both eyes may be captured or generated from the current eye image data 106 and provided to the eye model 110. The training and inference techniques for the eye model will be described in greater detail below with respect to FIGS. 3-4.

According to one or more embodiments, a set of neural maps 130 which are generated by a neural shader 128. The neural shader 128 may trained to produce the neural maps from a set of shading latents. The shading latents may be representative of a particular expression, lighting, and/or pose of a face. The neural maps 130 may include, for example, a neural displacement map, a neural ambient map, a neural diffuse map, a neural specular map, a neural shadow map, and the like. The shading decoder may be trained as part of a shading autoencoder or may be trained separately to produce neural maps 130 from a set of shading latents, for example from shading data 124, which may include an environment map 126.

Figure 10:
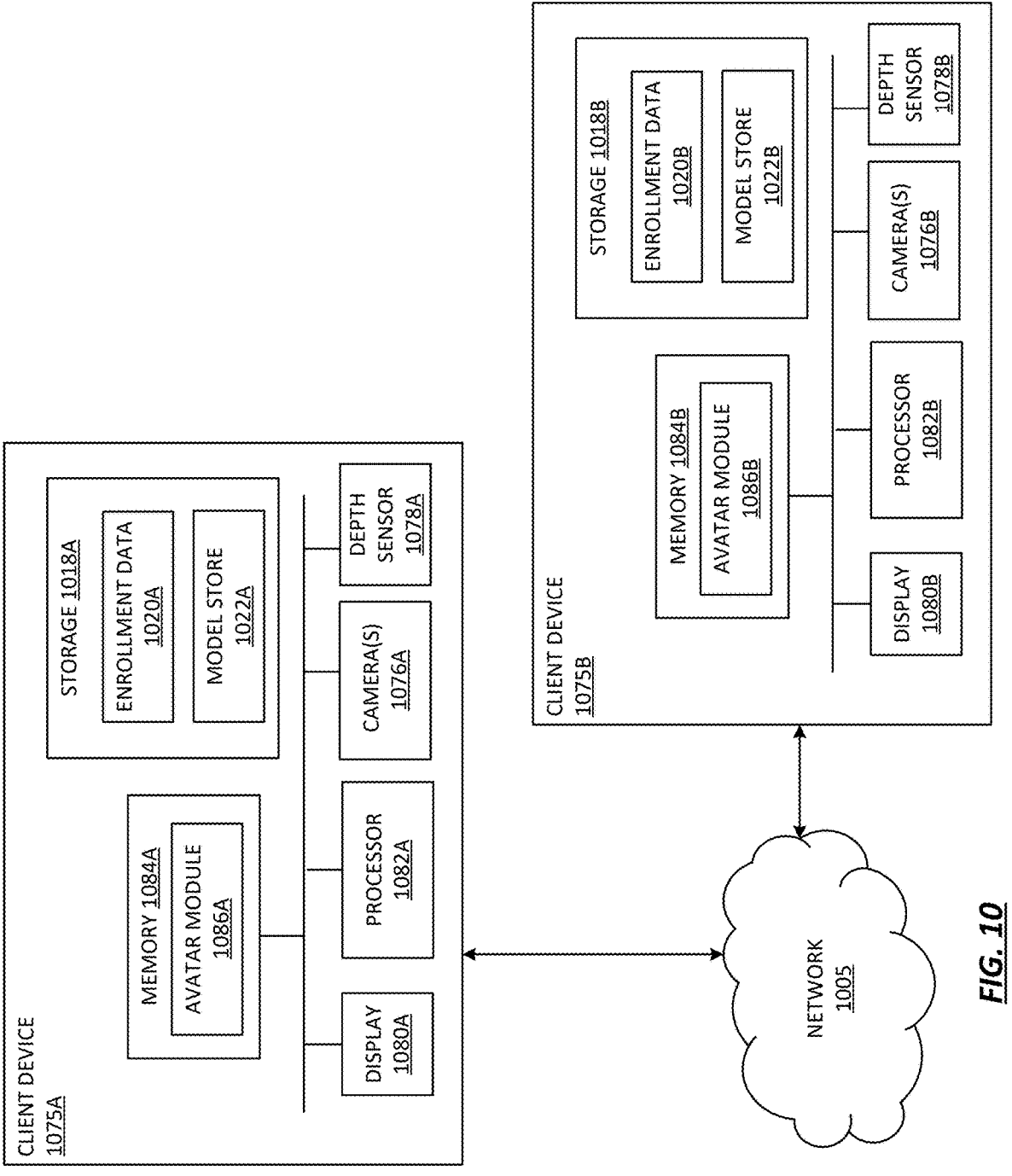
FIG. 10 shows, in block diagram form, a multifunction electronic device, in accordance with one or more embodiments.

According to one or more embodiments, a target texture 132 can be generated by combining the identity textures 114 with the generated eye texture 112, mouth texture 122, and neural maps 130. For example, an albedo texture map from the identity textures 114 can be combined with the generated eye texture 112 and/or mouth texture 122 to generate a combined albedo texture for the face at a particular frame corresponding to the expression latents from which the textures were derived. The albedo texture can be combined with the neural maps 130 to generate a target texture 132, as will be described in greater detail below with respect to FIG. 10.

Because the target texture 132 incorporates the particular shading and expression for a frame, the target texture can be used to render an avatar 136 for that frame. In some embodiments, the avatar can be rendered by generating an expression mesh 134 from the current expression latents 108 and applying the target texture 132 to the expression mesh 134. The avatar may be rendered in a number of ways. As an example, the target texture map may be rendered as an additional pass in a multipass rendering technique.

Figure 2:
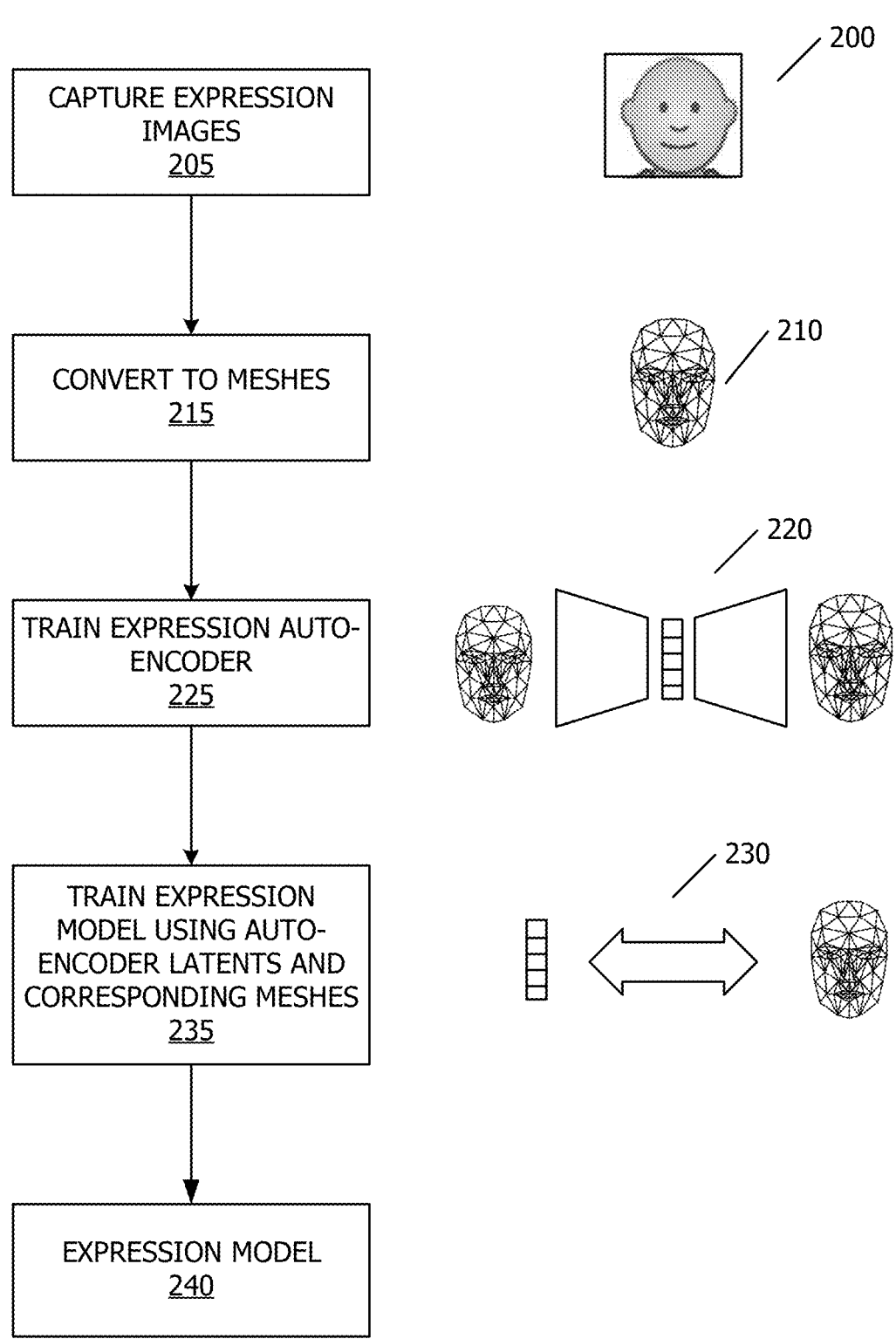
FIG. 2 shows a flowchart in which an expression model is trained, according to one or more embodiments.

Multiple portions of the techniques described above rely on the use of a compact representation of the geometry of the face of the user. In one or more embodiments, the compact representation may be in the form of expression latents from which a geometry of a face can be generated. Referring to FIG. 2, in one or more embodiments, an expression model is generated. First, expression images 200 from a relatively large number of individuals may be acquired (block 205). As used here, the phrase "expression image" means an image of an individual having a non-neutral expression (e.g., happy, sad, excited, fearful, questioning, etc.). By way of example, images 200 may be obtained via a photogrammetry or stereophotogrammetry system, a laser scanner, or an equivalent capture method. In some embodiments, the images may be obtained by a mobile device capturing images and/or depth information of the face of the user. Each expression image 200 may be converted into an expressive 3D mesh representation 210 (block 215) and used to train another auto-encoder neural network 220 (block 225). From there, an expression model 230 can be trained (block 235) to predict an expressive mesh from a set of expression latents from the trained expression autoencoder 220.

Referring to FIG. 3, a flow diagram is illustrated in which an eye model is trained in accordance with one or more embodiments. In particular, the flowchart shows a view of the technique for training the eye network as it is related to the expression model. According to one or more embodiments, the eye model may be trained from a series of images of one or more users in which the users are providing a particular expression or neutral image. Although the various process depicted in FIG. 3 are illustrated in a particular order, it should be understood that the various processes described may be performed in a different order. Further, not all of the various processes may be necessary to be performed to train the mesh and texture encoders and decoders or obtain lighting representations.

The flowchart begins at 205, where a training module captures or otherwise obtains expression images, as described above, with respect to FIG. 2. Further, in one or more embodiments, one or more eye images may be captured 305 which may be the same or different than the expression images described above. In some embodiments, the eye images captured at 305 may include a portion of images capturing a face of a user or may be one or more images that specifically capture one or more eyes of the user. For example, in some embodiments, the eye images may include one image of an eye region including both eyes, and/or may include an image for each eye.

The flowchart continues at 310 where the system obtains texture information for the eye area in the expression images. The texture information may include images from a camera capturing the face of the user, and in particular an eye region of the user. Then at 315, the system generates one or more eye texture maps for a particular expression image. The eye texture map may be an image patch of the eye region configured to overlaid over a geometry of the face to recreate the eye region in 3D space.

Returning to block 205, as described above, each expression image may be converted into an expressive 3D mesh representation (block 215) and used to train an auto-encoder neural network (block 225). From the autoencoder, a set of expression latents can be obtained, which is a compact representation of the geometry of the face based on the autoencoder training. Accordingly, at block 320, the eye network can be trained from the expression latents and the eye images to predict an eye texture for an eye region given a particular set of expression latents and eye image, resulting in the trained eye model 325.

Figure 4:
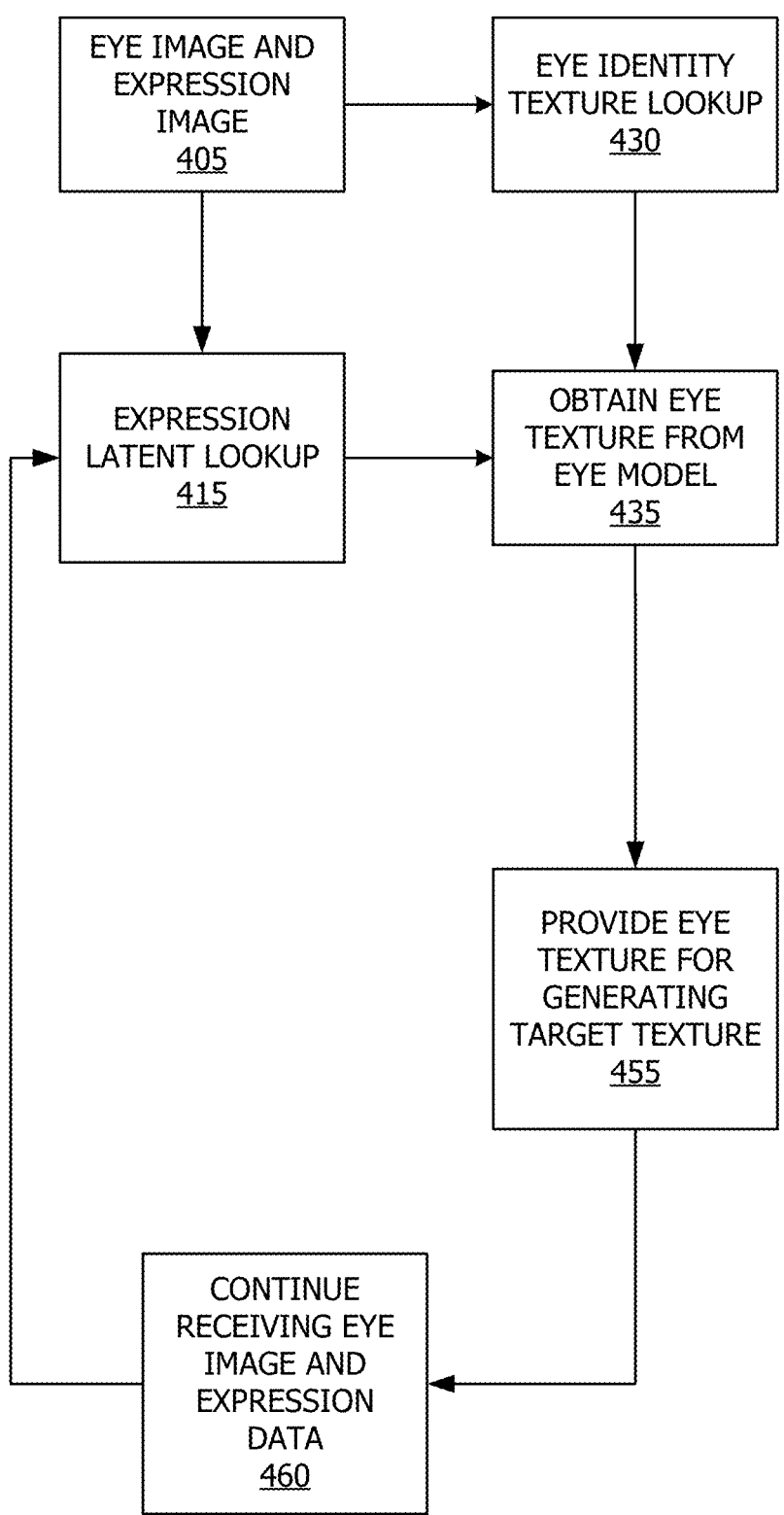
FIG. 4 shows an inference operation for an eye model, according to one or more embodiments.

Turning to FIG. 4, a flowchart for a technique for predicting an eye texture is presented. In particular, the technique describes generating an eye textures based on a stream of eye image data collected by a camera, according to one or more embodiments.

The flowchart begins at 405, in which an eye image and/or an expression image is captured. The eye image may be the same image as that captured of a user's face, such as an expression image, or may be an additional image, for example, from a camera directed at the eyes of a user. Upon receiving the eye image, an avatar module performs an eye identity lookup at 430. The eye identity lookup may include identifying one or more identity textures for the eye. In one or more embodiments, the eye identity textures may include a pseudo normal texture and a diffuse texture. The identity texture lookup may include requesting identity textures for the eye. Additionally, or alternatively, the identity textures for the eye may be obtained from local or remote storage, such as network storage.

From the eye image 405, a latent lookup may be performed with respect to the expression at 415. The latent representation may include a representation of a geometric shape of the face and may not be specific to the eye. Then, at block 435, the eye model may utilize the eye identity texture, the expression latent, and the eye image to predict the eye texture. In some embodiments, the eye model may be trained to predict an albedo texture of an eye region for a particular expression based on an eye identity information, an eye image, and the expression latents. Then, at 455, the eye model may provide the eye texture for generating the target texture. For example, the system may utilize the eye texture to generate a combined albedo texture map which can be lit according to a shading network. The flowchart continues at block 460, and the systems continues to receive eye image data and expression data, from which further e expression latents can be determined at block 415. Notably, the eye identity texture may only be looked up once, at block 430, and does not need to be obtained for every frame.

Figure 5:
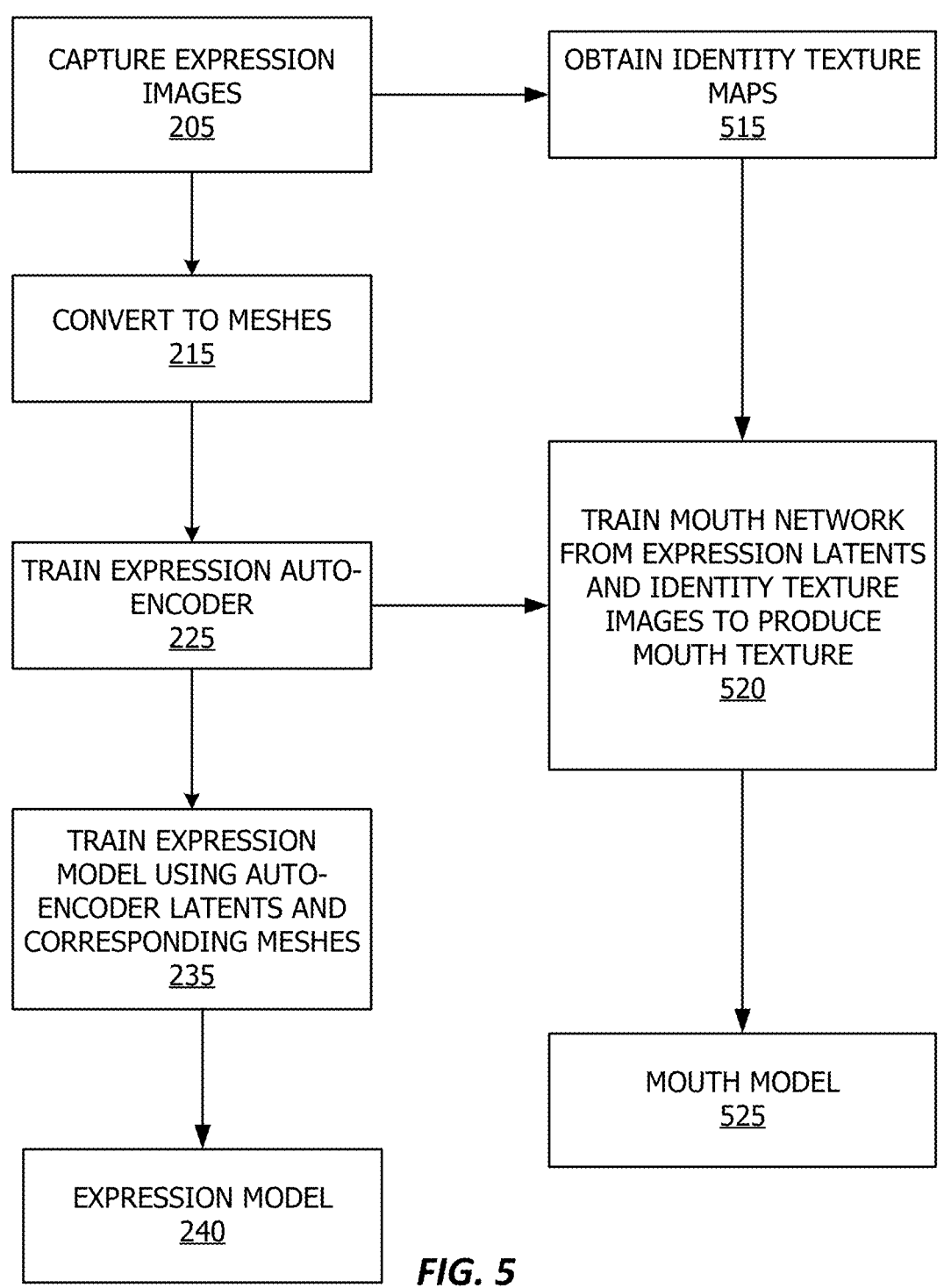
FIG. 5 shows, in flow diagram form, a technique for generating a mouth model, according to one or more embodiments.

Referring to FIG. 5, a flow diagram is illustrated in which a mouth model is trained in accordance with one or more embodiments. In particular, the flowchart shows a view of the technique for training the mouth network as it is related to the expression model. According to one or more embodiments, the mouth model may be trained from a series of images of one or more users in which the users are providing a particular expression or neutral image. Although the various process depicted in FIG. 5 are illustrated in a particular order, it should be understood that the various processes described may be performed in a different order. Further, not all the various processes may be necessary to be performed to train the mesh and texture encoders and decoders or obtain lighting representations.

The flowchart begins at 205, where a training module captures or otherwise obtains expression images, as described above, with respect to FIG. 2. The flowchart continues at 515, the system generates one or more mouth texture maps for a particular expression image. The mouth texture map may be an image patch of the mouth region configured to overlaid over a geometry of the face to recreate the mouth region in 3D space.

Returning to block 205, as described above, each expression image may be converted into an expressive 3D mesh representation (block 215) and used to train an auto-encoder neural network (block 225). From the autoencoder, a set of expression latents can be obtained, which is a compact representation of the geometry of the face based on the autoencoder training. Accordingly, at block 520, the mouth network can be trained from the expression latents to predict a mouth texture for a mouth region, resulting in the trained mouth model 525.

Figure 6:
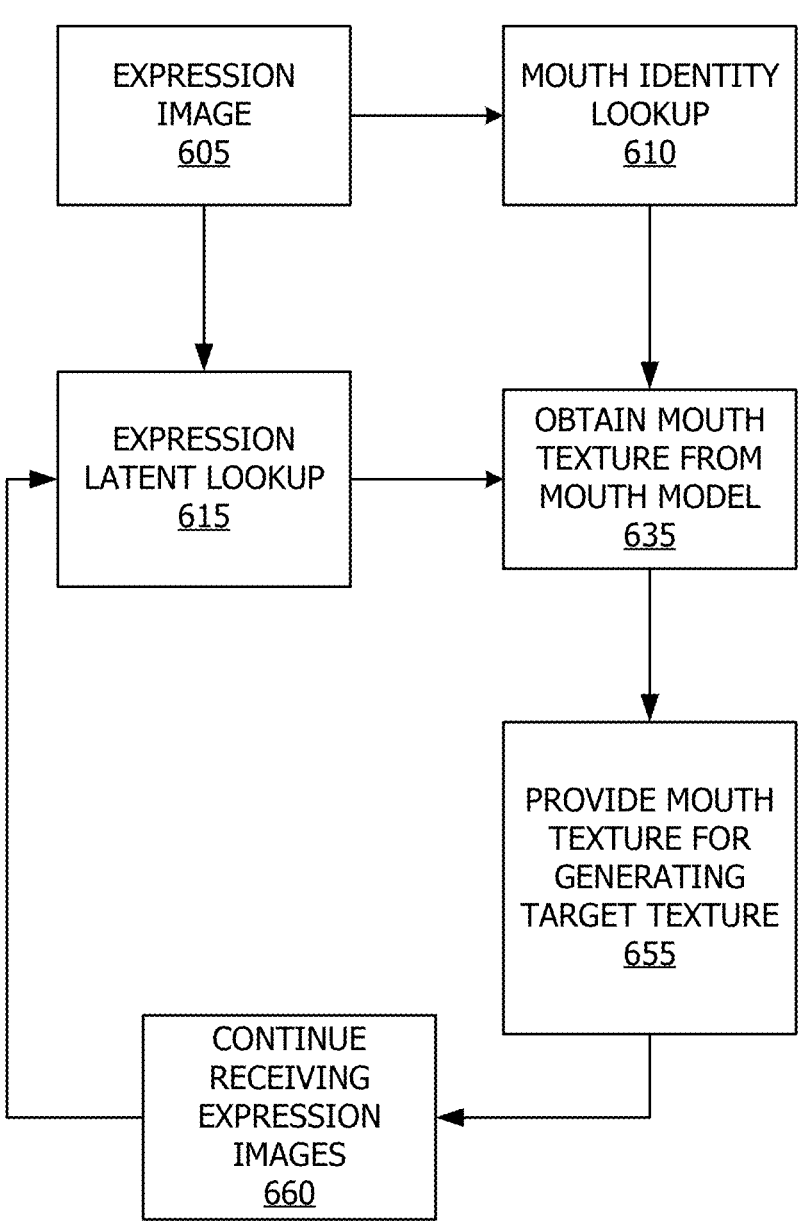
FIG. 6 shows an inference operation for a mouth model, according to one or more embodiments.

Turning to FIG. 6, a flowchart for a technique for predicting a mouth texture is presented. In particular, the technique describes generating mouth textures based on a stream of eye image data collected by a camera, according to one or more embodiments.

The flowchart begins at 605, in which an expression image is captured. Upon receiving the expression image, an avatar module performs a mouth identity lookup at 430. The mouth identity lookup may include identifying one or more identity textures for the mouth, which may be generated during an enrollment process. In one or more embodiments, the mouth identity textures may include a pseudo normal texture and a diffuse texture. The mouth texture lookup may include requesting identity textures for the mouth. Additionally, or alternatively, the identity textures for the mouth may be obtained from local or remote storage, such as network storage.

From the expression image 605, a latent lookup may be performed with respect to the expression at 615. The latent representation may include a representation of a geometric shape of the face and may not be specific to the mouth. Then, at block 635, the mouth model may utilize the mouth identity texture and the expression latent values to predict the mouth texture. In some embodiments, the mouth model may be trained to predict an albedo texture of a mouth region for a particular expression based on mouth identity information and the expression latents. Then, at 655, the mouth model may provide the mouth texture for generating the target texture. For example, the system may utilize the mouth texture to generate a combined albedo texture map which can be lit according to a shading network. The flowchart continues at block 660, and the systems continues to receive expression data, from which further expression latents can be determined at block 615. Notably, the mouth identity texture may only be looked up once, at block 610, and does not need to be obtained for every frame.

Figure 7:
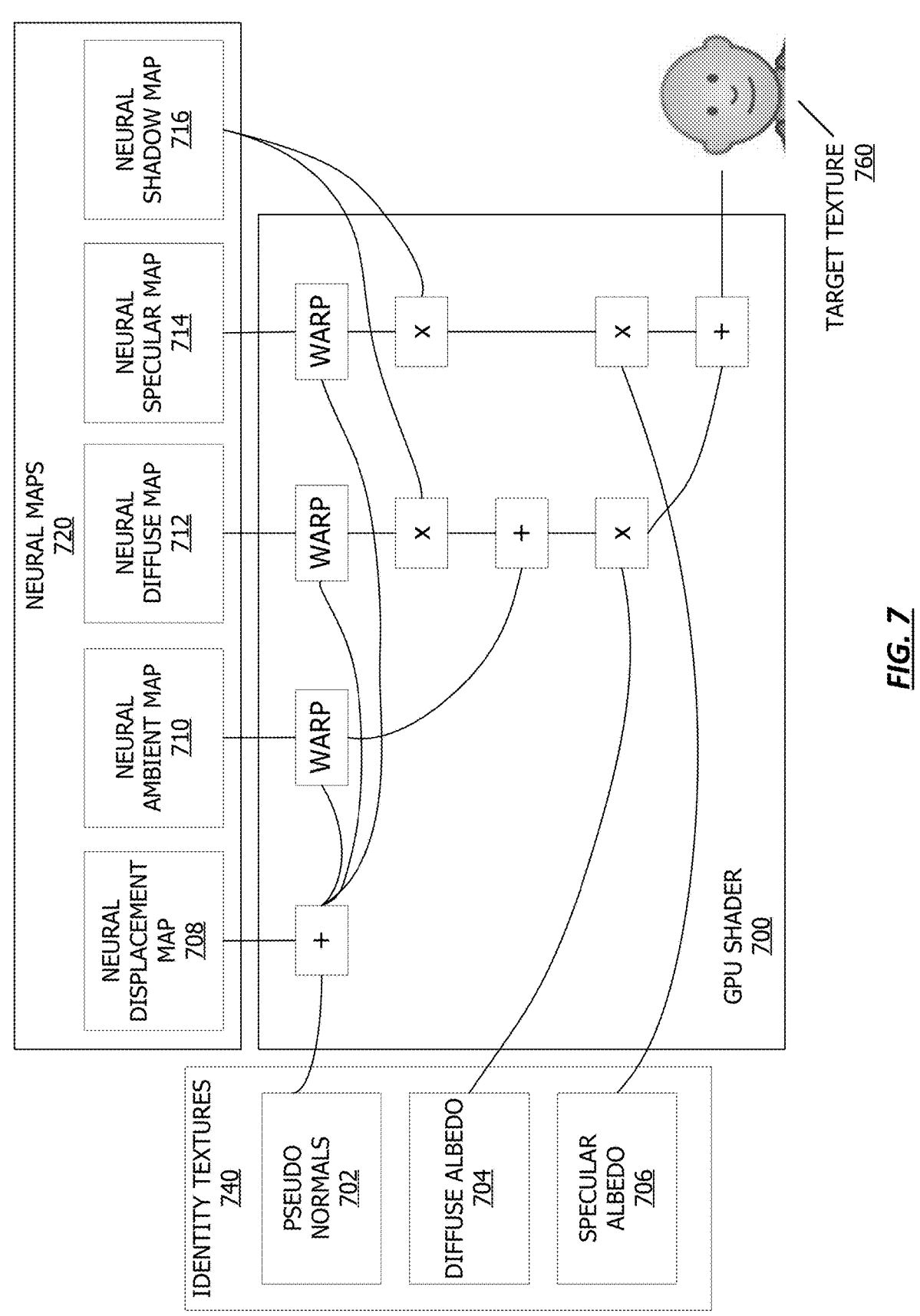
FIG. 7 shows a flow diagram of a technique for using neural maps to generate a target texture, according to one or more embodiments.

FIG. 7 shows, in flow diagram form, a technique for generating a target texture, in accordance with one or more embodiments. In particular, FIG. 7 shows an example embodiment in which a GPU shader 700 uses neural maps 720 to warp identity textures 740 to obtain a target texture 760. According to one or more embodiments, the neural maps include The flow diagram begins by combining the neural displacement map 708 with the pseudo-normals 702, which are representative of the unique texture of a person's face. A neural ambient map 710 is then warped by the combination. According to one or more embodiments, the neural ambient map 710 may include a general ambient map of the face combined with patches for the eye texture and mouth texture. The warped ambient map may also modify, such as multiply, the diffuse albedo texture to obtain an ambient result. In one or more embodiments, the pseudo-normal map and displacement map both have two channels, one channel representing horizontal pixel displacements and one representing vertical pixel displacements, which produce the warp. The neural diffuse map 712 and the neural specular map may also be warped by the combination. The warped neural diffuse map 712 may be modified, or multiplied, in accordance with the neural shadow map 716, which may in turn be used to modify, or multiply, the diffuse albedo texture 704. Similarly, the warped neural specular map 714 may be modified, or multiplied, in accordance with the neural shadow map 716, which may in turn be used to modify, or multiply, the specular albedo texture 706. The GPU shader 700 may combine the results (e.g., the ambient result, the diffuse result, and the specular result) to obtain target texture 760. According to one or more embodiments, the neural shadow map 716 may have two channels, one for diffuse and one for specular application.

Figure 8:
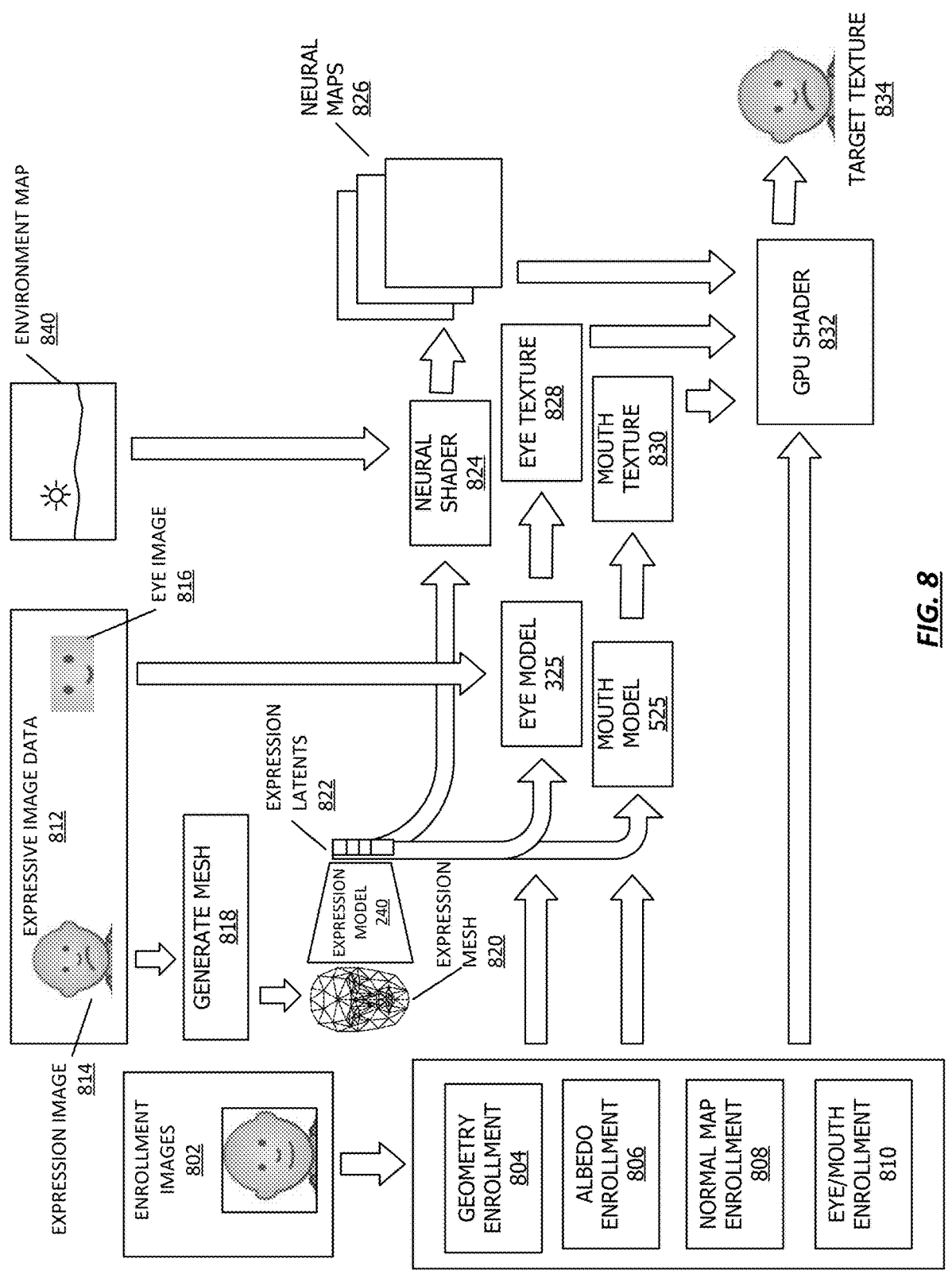
FIG. 8 shows, in flow diagram form, a technique for generating a target texture, in accordance with one or more embodiments.

Referring to FIG. 8, a flow diagram is presented in which an overall view of the techniques for generating an avatar are described. The flow diagram begins at 802 where enrollment images are received. The enrollment data may include, for example, a geometry enrollment 804 corresponding to the geometry of the face of the user, albedo enrollment, which may include an albedo map for the user. In some embodiments, the albedo enrollment 806 comprising an albedo texture for the user, a normal map enrollment 808 corresponding to a normal map of the face, and eye and/or mouth enrollment data 810, which may include one or more image patches of the eye and/or mouth of the user.

During runtime of a communication session expressive image data 812 is obtained. For example, image data of a face of a user 814 may be captured for each frame during the communication session. In some embodiments, additional eye image data 816 may be captured. From the image data, a mesh is generated at 818, for example from a trained network. The resulting mesh 820 may be applied to the expression model 240 to obtain a set of expression latents 822. Accordingly, the set of expression latents provide a compact representation of the geometry of a user's face for a particular expression for a given frame.

As described above, the eye model 325 can be trained to generate an eye texture. As such, eye model 325 may utilize the eye image 816, as well as the expression latents 822 to generate an eye texture 828. In some embodiments, the eye texture 828 may be an image patch of an eye region which can be combined with the albedo enrollment map 806. Similarly, the mouth model 525 can be trained to generate a mouth texture. As described above, mouth model 525 may include a graphical image of a portion of the mouth of the user which can be overlaid over a mesh to generate a mouth portion of the avatar. In one or more embodiments, the enrollment mouth texture may include an image patch of a region around the mouth of the user.

According to one or more embodiments, a set of neural maps 826 are generated by a neural shader 824. The neural shader 824 may be trained to produce the neural maps from a set of shading latents. The shading latents may be representative of a particular expression, lighting, and/or pose of a face based on an environment map 840. The neural maps 826 may include, for example, a neural displacement map, a neural ambient map, a neural diffuse map, a neural specular map, a neural shadow map, and the like.

According to one or more embodiments, a target texture 834 can be generated by combining the albedo enrollment 806 with the generated eye texture 828, mouth texture 830, and neural maps 826. For example, an albedo texture map from the identity textures can be combined with the generated eye texture 828 and/or mouth texture 830 to generate a combined albedo texture for the face at a particular frame corresponding to the expression latents from which the textures were derived. The albedo texture can be combined with the neural maps 826 to generate, by a GPU shader 832, a target texture 834.

Figure 9:
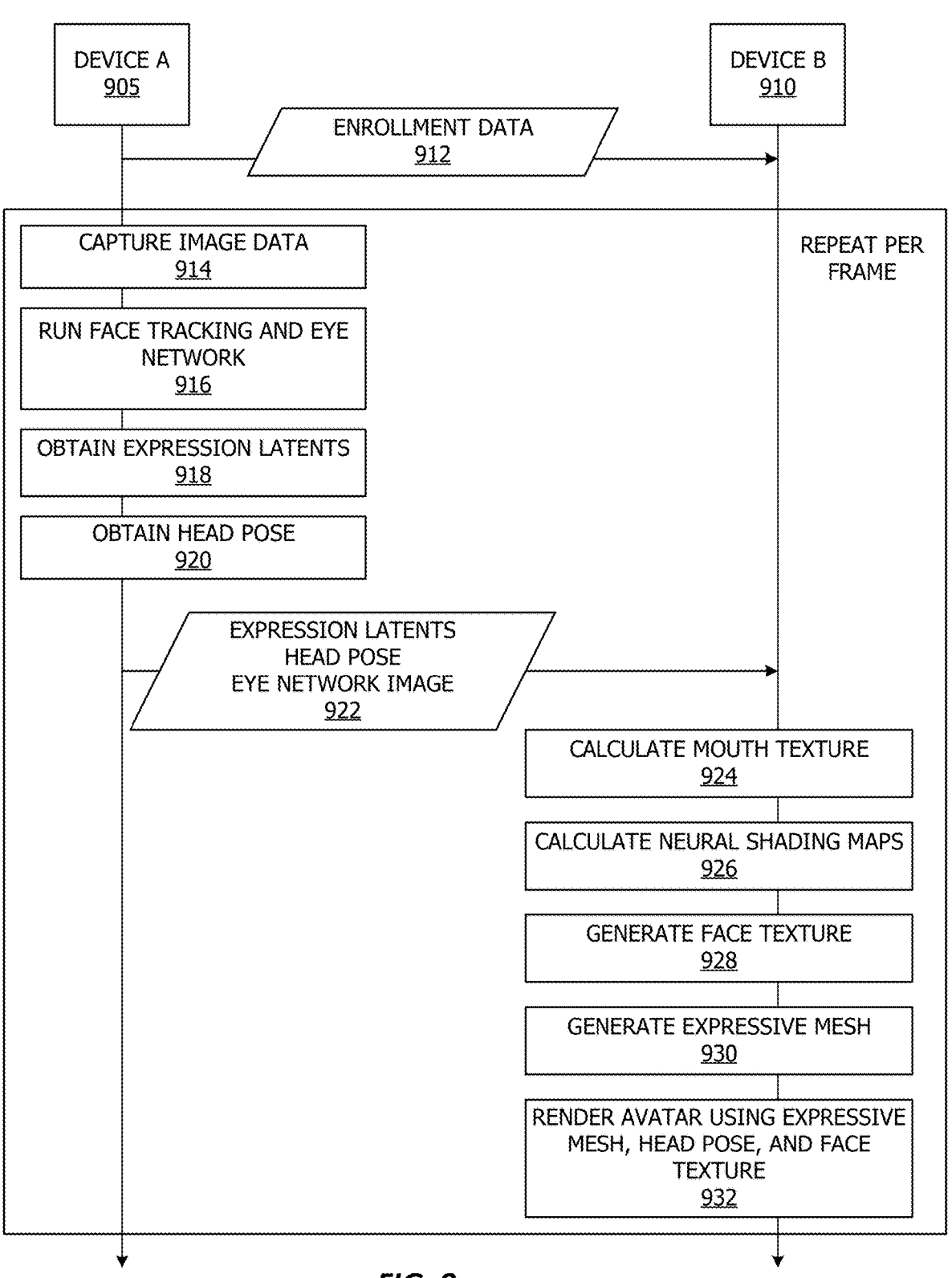
FIG. 9 shows a flow diagram illustrating a technique for rendering an avatar, in accordance with one or more additional embodiments.

Referring to FIG. 9, a flow diagram is presented including an example data flow between a first device (Device A 905) and a second device (Device B 910) participating in a communication session in which Device B 910 presents an avatar of a user of device A 905. Although the various processes are described as being performed by particular devices, it should be understood that in alternative embodiments, one or more of the processes may be performed by additional and/or alternative devices.

The flow diagram begins at 912 where Device A 905 provides enrollment data to Device B 910. The enrollment data may be shared, for example, through a handshake mechanism at the beginning of the communication session. The enrollment data may include, for example, identity latents and enrollment textures for a user of Device A 905. The identity latents may include, for example, geometric and/or other information for the user of Device A 905 which can be used to generate a visual representation of the user of Device A 905. The enrollment textures may include, for example, a geometry enrollment, albedo enrollment, normal map enrollment, eye enrollment and/or mouth enrollment data. In one or more embodiments, the enrollment data 912 may be obtained from storage on device A 905.

For each frame during the communication session, Device A 905 may capture image data (914). The image data may include one or more images captured by a camera directed toward the user. The image data may include one or more images capturing all and/or part of a user's face. At 916, Device A 905 can run tracking algorithms, including, for example, face tracking and eye tracking. The face tracking and eye tracking functionality may include, for example, applying the captured image data to various models to obtain information about the users. As described above, the eye network may produce a predicted eye texture based on the expression latents, current image data, and enrollment eye data. Further, at 918, the face tracking technique may include applying the image data to an expression model to obtain a set of expression latents for an expression by the user in the particular frame. In addition, a head pose for the user may be obtained (920). Then at 922, Device A 905 transmits the expression latents, head pose, and eye network image to Device B 910.

According to one or more embodiments, Device B 910 can receive the expression latents, head pose, and eye network image to generate the avatar. Specifically, at 924, Device B 910 can use the received expression latents (from 922) and mouth enrollment data (from 912) to calculate a mouth image 924. For example, Device B 910 may use a trained mouth model to generate a predicted mouth texture. Further, at 926, Device B 910 can use the expression latents and head pose (from 922) as well as some lighting information to calculate neural shading maps. At 928, Device B 910 generates a face texture based on the eye network image (from 922), the mouth image (from 924) and enrollment textures (from 912) to calculate a final dynamic texture map. According to some embodiments, the dynamic face texture may be generated by a GPU of Device B 910.

Because the second device has the geometric information in the form of expression latent values (from 922) and/or identity latent values (from 912), Device B 910 can calculate the final posed expressive mesh at 930 by applying the expression latents to a trained network. The final representation of the avatar can be rendered at Device B 910 at 932 by combining the posed mesh, the head pose, and the dynamic face texture.

Referring to FIG. 7, a simplified block diagram of a client device 1075A is depicted, communicably connected to a client device 1075B, in accordance with one or more embodiments of the disclosure. Client device 1075A and client device 1075B may each be part of a multifunctional device, such as a mobile phone, tablet computer, personal digital assistant, portable music/video player, wearable device, base station, laptop computer, desktop computer, network device, or any other electronic device. Client device 1075A may be connected to the client device 1075B across a network 1005. Illustrative networks include, but are not limited to, a local network such as a universal serial bus (USB) network, an organization's local area network, and a wide area network such as the Internet. According to one or more embodiments, client device 1075A and client device 1075B may participate in a communication session in which each device may render an avatar of a user of the other client device.

Each of client device 1075A and client device 1075B may include a processor, such as a central processing unit (CPU), 1082A and 1082B. Processor 1082A and processor 1082B may each be a system-on-chip such as those found in mobile devices and include one or more dedicated graphics processing units (GPUs). Further, each of processor 1082A and processor 1082B may include multiple processors of the same or different type. Each of client device 1075A and client device 1075B may also include a memory 1084A and 1084B. Each of memory 1084A and memory 1084B may include one or more different types of memory, which may be used for performing device functions in conjunction with processors 1082A and 1082B. For example, each of memory 1084A and memory 1084B may include cache, ROM, RAM, or any kind of transitory or non-transitory computer-readable storage medium capable of storing computer-readable code. Each of memory 1084A and memory 1084B may store various programming modules for execution by processors 1082A and 1082B, including avatar modules 1086A and 1086B. Each of client device 1075A and client device 1075B may also include storage 1018A and 1018B. Each of storage 1018A and 1018B may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Each of storage 1018A and 1018B may include enrollment data 1020A and 1020B and model store 1022A and 1022B.

Each of client device 1075A and client device 1075B may also include one or more cameras 1076A and 1076B or other sensors, such as depth sensor 1078A and depth sensor 1078B, from which depth of a scene may be determined. In one or more embodiments, each of the one or more cameras 1076A and 1076B may be a traditional RGB camera or a depth camera. Further, each of the one or more cameras 1076A and 1076B may include a stereo- or other multi-camera system, a time-of-flight camera system, or the like which capture images from which depth information of a scene may be determined. Each of client device 1075A and client device 1075B may allow a user to interact with extended reality (XR) environments. There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display device 1080A and 1080B may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 11:
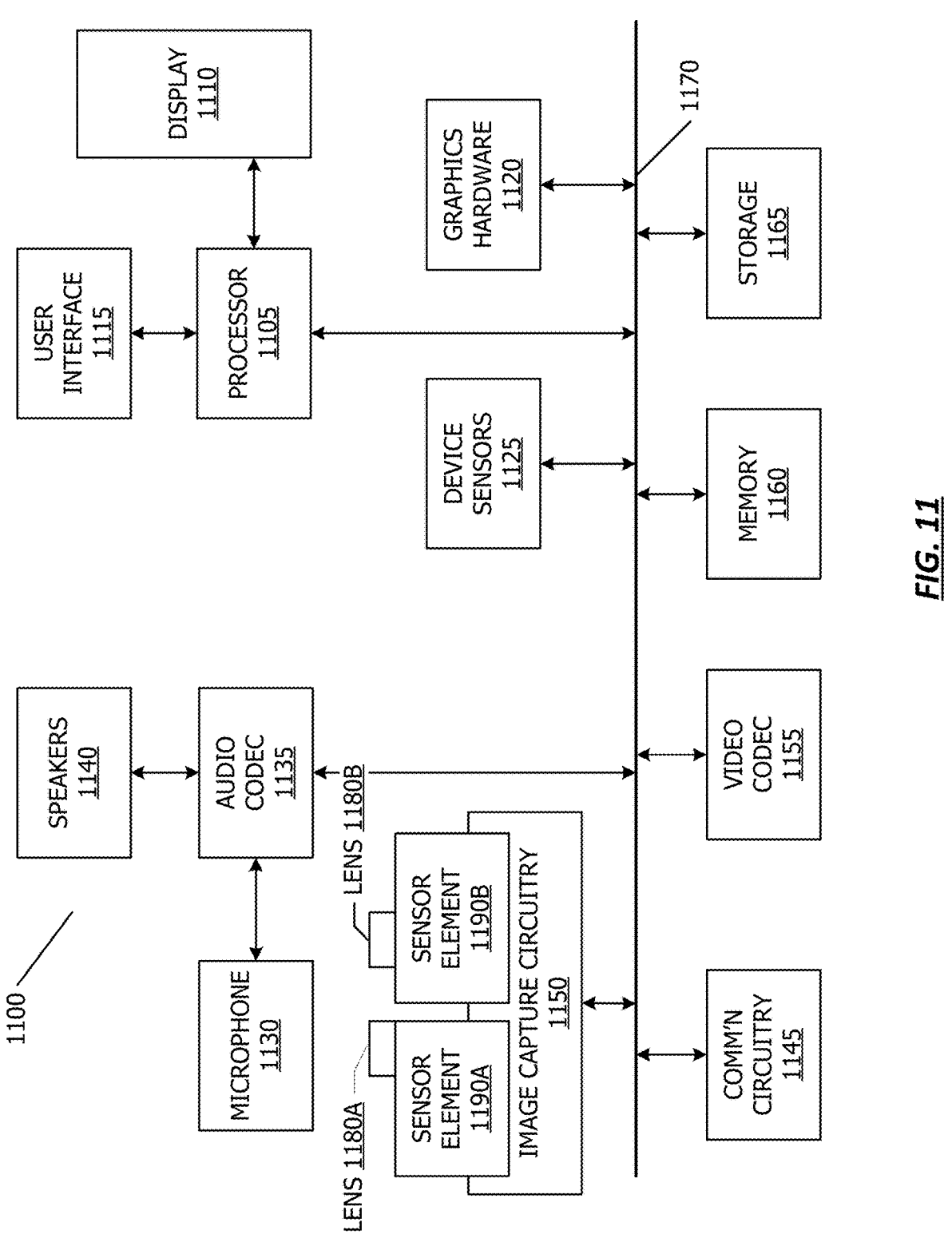
FIG. 11 shows, in block diagram form, a computer system, in accordance with one or more embodiments.

Referring now to FIG. 11, a simplified functional block diagram of illustrative multifunction electronic device 1100 is shown, according to one embodiment. Each of electronic devices may be a multifunctional electronic device or may have some or all of the described components of a multifunctional electronic device described herein. Multifunction electronic device 1100 may include processor 1105, display 1110, user interface 1115, graphics hardware 1120, device sensors 1125 (e.g., proximity sensor/ambient light sensor, accelerometer and/or gyroscope), microphone 1130, audio codec(s) 1135, speaker(s) 1140, communications circuitry 1145, digital image capture circuitry 1150 (e.g., including camera system), video codec(s) 1155 (e.g., in support of digital image capture unit), memory 1160, storage device 1165, and communications bus 1170. Multifunction electronic device 1100 may be, for example, a digital camera or a personal electronic device such as a personal digital assistant (PDA), personal music player, mobile telephone, or a tablet computer.

Processor 1105 may execute instructions necessary to carry out or control the operation of many functions performed by device 1100 (e.g., such as the generation and/or processing of images as disclosed herein). Processor 1105 may, for instance, drive display 1110 and receive user input from user interface 1115. User interface 1115 may allow a user to interact with device 1100. For example, user interface 1115 can take a variety of forms, such as a button, keypad, dial, a click wheel, keyboard, display screen and/or a touch screen. Processor 1105 may also, for example, be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information. In one embodiment, graphics hardware 1120 may include a programmable GPU.

Image capture circuitry 1150 may include two (or more) lens assemblies 1180A and 1180B, where each lens assembly may have a separate focal length. For example, lens assembly 1180A may have a short focal length relative to the focal length of lens assembly 1180B. Each lens assembly may have a separate associated sensor element 1190. Alternatively, two or more lens assemblies may share a common sensor element. Image capture circuitry 1150 may capture still and/or video images. Output from image capture circuitry 1150 may be processed, at least in part, by video codec(s) 1155 and/or processor 1105 and/or graphics hardware 1120, and/or a dedicated image processing unit or pipeline incorporated within image capture circuitry 1150. Images so captured may be stored in memory 1160 and/or storage 1165.

Image capture circuitry 1150 may capture still and video images that may be processed in accordance with this disclosure, at least in part, by video codec(s) 1155 and/or processor 1105 and/or graphics hardware 1120, and/or a dedicated image processing unit incorporated within image capture circuitry 1150. Images so captured may be stored in memory 1160 and/or storage 1165. Memory 1160 may include one or more different types of media used by processor 1105 and graphics hardware 1120 to perform device functions. For example, memory 1160 may include memory cache, read-only memory (ROM), and/or random access memory (RAM). Storage 1165 may store media (e.g., audio, image and video files), computer program instructions or software, preference information, device profile information, and any other suitable data. Storage 1165 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 1160 and storage 1165 may be used to tangibly retain computer program instructions or code organized into one or more modules and written in any desired computer programming language. When executed by, for example, processor 1105, such computer program code may implement one or more of the methods described herein.

The present disclosure recognizes that the use of such personal information data, in the present technology, can be used to the benefit of users. For example, the personal information data can be used generate avatar representations of a user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA), whereas health data in other countries may be subject to other regulations and policies and should be handled accordingly. Hence, different privacy practices should be maintained for different personal data types in each country.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions or the arrangement of elements shown should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
obtaining enrollment data associated with a user, wherein the enrollment data comprises a plurality of identity textures of a face of the user, and wherein the enrollment data is generated from sensor data captured during an enrollment period;
obtaining a set of expression latents for the user for a first frame of a runtime period;
generating a first targeted texture for a first portion of the face of the user based on the enrollment data and the set of expression latents; and
generating a target texture for the first frame by combining the first targeted texture with a first identity texture of the plurality of identity textures to obtain a combined albedo map for the first frame.

2. The method of claim 1, further comprising:
generating an expressive mesh based on the set of expression latents; and
rendering an avatar by applying the target texture to the expressive mesh.

3. The method of claim 1, wherein generating the target texture further comprises:
obtaining one or more neural maps based on the set of expression latents, a head pose for the user, and a selected lighting, and
warping the plurality of identity textures in accordance with the one or more neural maps,
wherein the one or more neural maps comprises at least one selected from a group consisting of a neural displacement map, an ambient map, a diffuse map, and a specular map.

4. The method of claim 1, wherein generating the first targeted texture comprises applying the set of expression latents to a first model trained to predict a texture for a first portion of an expressive mesh associated with the set of expression latents.

5. The method of claim 1, further comprising:
obtaining a second texture for a second portion of the face based on the set of expression latents and image data for the second portion of the face,
wherein the combined albedo map is further generated based on the second texture.

6. The method of claim 5, wherein the second texture is obtained by applying image data for the second portion of the face and the set of expression latents to a second model trained to predict a texture for a second portion of an expressive mesh associated with the set of expression latents.

7. The method of claim 1, wherein the plurality of identity textures comprises at least one selected from a group consisting of a pseudo normal texture, a diffuse albedo texture, and a specular albedo texture.

8. The method of claim 1, further comprising, for each of one or more additional frames:
obtaining an additional set of expression latents for the user; and
generating an additional texture based on the enrollment data and the additional set of expression latents;
generating an additional combined albedo map based on the plurality of identity textures from the enrollment data and the additional texture; and
generating an additional target texture based on the plurality of identity textures and the additional combined albedo map.

9. A non-transitory computer readable medium comprising computer readable code executable by one or more processors to:
obtain enrollment data associated with a user, wherein the enrollment data comprises a plurality of identity textures of a face of the user, and wherein the enrollment data is generated from sensor data captured during an enrollment period;
obtain a set of expression latents for the user for a first frame of a runtime period;
generate a first targeted texture for a first portion of the face of the user based on the enrollment data and the set of expression latents; and
generate a target texture for the first frame by combining the first targeted texture with a first identity texture of the plurality of identity textures to obtain a combined albedo map for the first frame.

10. The non-transitory computer readable medium of claim 9, further comprising, computer readable code to:
generating an expressive mesh based on the set of expression latents; and
rendering an avatar for the first frame by applying the target texture to the expressive mesh.

11. The non-transitory computer readable medium of claim 9, wherein the computer readable code to generate the target texture further comprises computer readable code to:
obtain one or more neural maps based on the set of expression latents, a head pose for the user, and a selected lighting, and
warp the plurality of identity textures in accordance with the one or more neural maps,
wherein the one or more neural maps comprises at least one selected from a group consisting of a neural displacement map, an ambient map, a diffuse map, and a specular map.

12. The non-transitory computer readable medium of claim 9, wherein the computer readable code to generate the first targeted texture comprises computer readable code to apply the set of expression latents to a first model trained to predict a texture for a first portion of an expressive mesh associated with the set of expression latents.

13. The non-transitory computer readable medium of claim 9, further comprising computer readable code to:
obtaining a second texture for a second portion of the face based on the set of expression latents and image data for the second portion of the face,
wherein the combined albedo map is further generated based on the second texture.

14. The non-transitory computer readable medium of claim 13, wherein the second texture is obtained by applying image data for the second portion of the face and the set of expression latents to a second model trained to predict a texture for a second portion of an expressive mesh associated with the set of expression latents.

15. The non-transitory computer readable medium of claim 9, wherein the plurality of identity textures comprises at least one selected from a group consisting of a pseudo normal texture, a diffuse albedo texture, and a specular albedo texture.

16. The non-transitory computer readable medium of claim 9, further comprising computer readable code to, for each of one or more additional frames:

obtain an additional set of expression latents for the user; and generate an additional texture based on the enrollment data and the additional set of expression latents;

generate an additional combined albedo map based on the plurality of identity textures from the enrollment data and the additional texture; and generate an additional target texture based on the plurality of identity textures and the additional combined albedo map.

17. A system comprising:

one or more processors; and one or more computer readable media comprising computer readable code executable by the one or more processors to:

obtain enrollment data associated with a user, wherein the enrollment data comprises a plurality of identity textures of a face of the user, and wherein the enrollment data is generated from sensor data captured during an enrollment period;

obtain a set of expression latents for the user for a first frame of a runtime period;

generate a first targeted texture for a first portion of the face of the user based on the enrollment data and the set of expression latents; and generate a target texture for the first frame by combining the first targeted texture with a first identity texture of the plurality of identity textures to obtain a combined albedo map for the first frame.

18. The system of claim 17, further comprising, computer readable code to:

generate an expressive mesh based on the set of expression latents; and render an avatar for the first frame by applying the target texture to the expressive mesh.

19. The system of claim 17, wherein the computer readable code to generate the target texture further comprises computer readable code to:

obtain one or more neural maps based on the set of expression latents, a head pose for the user, and a selected lighting, and warp the plurality of identity textures in accordance with the one or more neural maps, wherein the one or more neural maps comprises at least one selected from a group consisting of a neural displacement map, an ambient map, a diffuse map, and a specular map.

20. The system of claim 17, wherein the computer readable code to generate the first targeted texture comprises computer readable code to apply the set of expression latents to a first model trained to predict a texture for a first portion of an expressive mesh associated with the set of expression latents.

* * * * *